United States Patent [19]

Doty

[11] Patent Number: 5,591,951
[45] Date of Patent: Jan. 7, 1997

[54] SYSTEM AND METHOD FOR SIMULTANEOUSLY COLLECTING SERIAL NUMBER INFORMATION FROM NUMEROUS IDENTITY TAGS

[75] Inventor: Michael A. Doty, Manteca, Calif.

[73] Assignee: The Regents of the University of California, Oakland, Calif.

[21] Appl. No.: 542,214

[22] Filed: Oct. 12, 1995

[51] Int. Cl.⁶ .................................................. G06K 7/00
[52] U.S. Cl. ...................... 235/435; 235/375; 340/825.34
[58] Field of Search ...................... 235/380, 375, 235/382, 435; 340/825.3, 825.31, 325.32, 825.34

[56] References Cited

U.S. PATENT DOCUMENTS

| | | | |
|---|---|---|---|
| 4,800,543 | 1/1989 | Lyndon-James et al. | 368/10 |
| 5,030,807 | 7/1991 | Landt et al. | 235/375 |
| 5,430,441 | 7/1995 | Bickley et al. | 235/375 X |
| 5,444,223 | 8/1995 | Blama | 235/435 |
| 5,478,991 | 12/1995 | Watanabe et al. | 235/375 |
| 5,541,583 | 7/1996 | Mandelbaum | 340/825.31 X |
| 5,541,585 | 7/1996 | Duhame et al. | 340/825.31 X |

Primary Examiner—Donald T. Hajec
Assistant Examiner—Jeffrey R. Filipek
Attorney, Agent, or Firm—Henry P. Sartorio; Richard B. Main

[57] ABSTRACT

A system and method for simultaneously collecting serial number information reports from numerous colliding coded-radio-frequency identity tags. Each tag has a unique multi-digit serial number that is stored in non-volatile RAM. A reader transmits an ASCII coded "D" character on a carrier of about 900 MHz and a power illumination field having a frequency of about 1.6 Ghz. A one MHz tone is modulated on the 1.6 Ghz carrier as a timing clock for a microprocessor in each of the identity tags. Over a thousand such tags may be in the vicinity and each is powered-up and clocked by the 1.6 Ghz power illumination field. Each identity tag looks for the "D" interrogator modulated on the 900 MHz carrier, and each uses a digit of its serial number to time a response. Clear responses received by the reader are repeated for verification. If no verification or a wrong number is received by any identity tag, it uses a second digital together with the first to time out a more extended period for response. Ultimately, the entire serial number will be used in the worst case collision environments; and since the serial numbers are defined as being unique, the final possibility will be successful because a clear time-slot channel will be available.

9 Claims, 4 Drawing Sheets

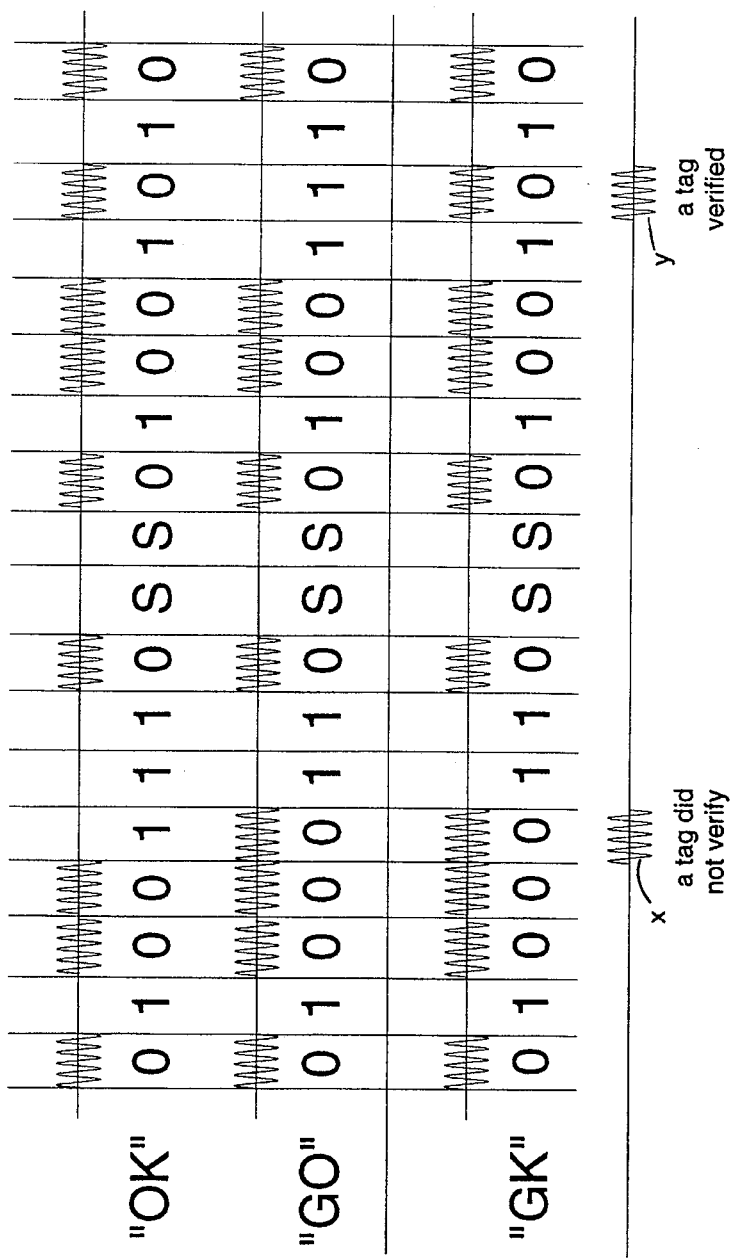

SYSTEM AND METHOD FOR SIMULTANEOUSLY COLLECTING SERIAL NUMBER INFORMATION FROM NUMEROUS IDENTITY TAGS

The U.S. Government has rights in this invention pursuant to Contract No. W-7405-ENG-48 between the U.S. Department of Energy and the University of California for the operation of Lawrence Livermore National Laboratory.

BACKGROUND OF THE INVENTION

1. Field of the Invention

The present invention relates to coded radio frequency tag identification systems and more particularly sorting through and collecting colliding reports caused by turning all the identity tags on at the same time in a small area.

2. Description of Related Art

Electronic item identification systems are in widespread use in a variety of applications. One familiar electronic item identification system uses bar code labels on retail shelf merchandise. These types of systems are typically used by supermarkets, distributors, shipping services and clothing retailers to scan the bar code labels for quick retrieval of an item's price or other information. Bar code labels can be printed by ordinary means as a series of lines of varying widths or thickness. The pattern establishes a code which can be read by a scanner, e.g., one based on a laser. The data from the scanner is electronically fed to a computer which interprets the bar code label into an identification code or number that is used to index a database of item price or other descriptors. The computer sends back the price and description to the cash register for checkout.

According to U.S. Pat. No. 5,444,223, issued Aug. 22, 1995, to Blama, another class of electronic item identification systems uses radio frequency (RF) identity tags to identify items. Such RF identity tags are used to identify a variety of items to which the tags are attached or otherwise associated, e.g., to identify passengers, luggage, library books, inventory items and other articles. RF identity tags also allow the electronic identification of people or objects, moving or stationary, at distances of several feet. In recent years, radio frequency identity tags have been manufactured using microminiature silicon chips. But, according to Blama, such chips are very expensive and cannot be produced in the quantities necessary to make the tags feasible. He contends that the silicon chip identity tags have a limited range of approximately two feet, e.g., using scanners that send out one signal that the chip phase shifts back. Blama says it would be desirable to develop a radio frequency identity tag that could be manufactured in mass quantities on a less expensive material than silicon such as paper or plastic and that could be used without having to alter the circuits on the tags.

Other types of RF identity tags are configured for recognition and surveillance functions. It would be desirable for RF identification cards to allow both recognition and identification functions with the card and on an inexpensive material. Interrogation and identification functions are not directly derivative from recognition and surveillance functions. For example, U.S. Pat. No. 4,694,283 to Reeb, and U.S. Pat. No. 4,910,499 to Benge, et al., each describe multilayered RF identity tags, wherein conductive layers are separated by a layer of dielectric material to form a resonant circuit. However, the Reeb patent limits itself to an electronic surveillance device, and the Benge, et al., is limited to an anti-theft device. These describe only recognition functions and do not teach the means necessary for identification. The recognition function can depend on reading the resonant frequency of the tag to find a match or on the return of some serial response code.

Some prior art RF identification cards use a pattern of binary ones and zeros in a code. A resonant circuit is alternated between a first and second resonating frequency. For example, U.S. Pat. No. 5,218,189, to Hutchinson, discloses a binary encoded multiple frequency RF identity tag and U.S. Pat. No. 5,103,210, to Rode, et al., discloses an security tag that can be activated and de-activated. Such tags both include an inductance connected in parallel with a capacitance comprising many individual capacitors which each have a predetermined different capacitance and which are connected in series. Rode, et al., teaches two capacitance branches that each have a predetermined capacitance with individual capacitors of each branch connected in series. The binary number codes are generated by switching the capacitors in and out. It would be desirable to develop an electronic item identification system using an RF identity tag wherein each circuit on the tag has a constant inductance and capacitance and thus the circuit itself does not have to be changed to check for the resonating frequency.

The devices of the Hutchinson and Rode, et al., patents short out capacitors during interrogation, and thus the circuit can never be restored to its original frequency to be read over again. It would be desirable to develop an electronic item identification system in which the RF identity tag can be read any number of times while still generating the same binary number as was read the first time, and in this manner the tag can be reused.

The Hutchinson and Rode, et al., patents teach a device where the binary number to be obtained from the tag must be predetermined. This is because the device teaches the "dimpling" of capacitors which, to be accurate, must be done with expensive, precision equipment. It would be desirable to develop an electronic item identification system in which an RF identity tag having numerous circuits made up of capacitor/inductor coil pairs at evenly spaced intervals on the surface of the tag so that the presence or absence of a circuit or the circuit's functionality could be programmed at the point of use with inexpensive equipment.

In U.S. Pat. No. 5,166,676, issued Nov. 24, 1992, Milheiser lists prior art identification device systems as usually having an exciter associated with an interrogator that is used to feed a combined alternating current clock signal and power supply signal to a responder device over an inductive coupling. The responders are implanted in animals or in other things with an identity that is to be ascertained, such as a freight car. The responder issues a coded identification signal which is fed back through the inductive coupling to a detector and demodulator to produce an output code representing the particular animal or thing being identified.

Many coded data transmission systems have been used. In some, the responder comprises a resonant circuit which varies in frequency according to the identification code. In Kaplan, et al., U.S. Pat. No. 3,689,885, coded information is returned from a responder to an interrogator as fixed-frequency CW bursts. In Beigel, U.S. Pat. No. 4,333,072, the responder or tag circuit produces a signal by varying the load across the inductor responsive to the encoded signal characteristic of the animal or thing being identified. All of these systems are subject to certain drawbacks, e.g., the resonant circuit systems are susceptible to temperature variations that affect the resonance frequency. Such variations produce spurious frequencies that are difficult to guard against. Systems that use code signals suffered from variations in amplitude of an oscillating circuit.

The identifying device may take the shape of a credit card having an electronic circuit embedded therein for radiating signals of identifying intelligence. An individual possessing the card may position it adjacent to a door that they want to enter. A recognition device may be arranged to control the door latch. Thus, if it recognizes radiated signals of certain predetermined intelligence, the door latch responds to the reader when the individual places the "card" proximate to the reader. Other uses for such systems include having the identifier in the form of a tag attached to a vehicle to be identified. Also, in production lines, garments or items may carry identifying tags so that they can be appropriately processed as they are recognized along various points in the production processes.

In the electronic portable recognition and identifier systems of the prior art, there are two directions of communications between the reader and the identifier devices. A stationary reader sends an interrogation signal and/or power to a portable identifier device, e.g., card, tag, key. In response, the identifier device sends a coded identification signal back to the reader. Means must be provided so that the two directions of communication and power do not inhibit one another. In the general class of electronic portable identification and recognition systems, inductive coupling is used between the reader and the identifier, as contrasted with electric field dipole antenna coupling systems. In conventional systems, often both power and data are transmitted over the same inductively coupled coils. In some, interference between the two paths of the reader and identifier is avoided by using time or frequency separation, or by modulating the electromagnetic power field and detecting such modulation in the radiated reader field. But time separation increases the total transaction time. Frequency separation means the coil of the portable identifier cannot be tuned simultaneously to two different frequencies. Such inability to tune, makes one direction inefficient. According to Walton, a disadvantage of power field modulation is that power losses occur in the identifier when the identifier modulates the power field.

None of the prior art appears to address the problem of sorting through many identity tags that are attempting to report-in simultaneously. Each teaching concerns itself with the basic communication mode; and given the crowded appearance of the subject area, there are several mediums to pick from that can now be considered conventional.

SUMMARY OF THE INVENTION

An object of the present invention is to provide a tag identity collection system and method for collecting the reports from a large number of identity tags that can all try to report simultaneously in a localized area.

A further object of the present invention is to provide an identity tag for a coded-radio-frequency identity tag system that is exceedingly inexpensive to produce.

Briefly, a system and method of the present invention comprise simultaneously collecting serial number information reports from numerous colliding coded-radio-frequency identity tags. Each tag has a unique multi-digit serial number that is stored in non-volatile RAM. A reader transmits an ASCII coded "D" character on a carrier of about 900 MHz and a power illumination field having a frequency of about 1.6 Ghz. A one MHz tone is modulated on the 1.6 Ghz carrier as a timing clock for a microprocessor in each of the identity tags. Over a thousand such tags may be in the vicinity, and each is powered-up and clocked by the 1.6 Ghz power illumination field. Each identity tag looks for the "D" interrogator modulated on the 900 MHz carrier, and each uses a digit of its serial number to time a response. Clear responses received by the reader are repeated for verification. If no verification or a wrong number is received by any identity tag, it uses a second digital together with the first to time out a more extended period for response. Ultimately, the entire serial number will be used in the worst case collision environments; and since the serial numbers are defined as being unique, the final possibility will be successful because a clear time-slot channel will be available.

An advantage of the present invention is that a system and method are provided that can collect the reports of large numbers of reporting stations that all initially attempt to simultaneously report.

An advantage of the present invention is that an identity tag is provided that is inexpensive to manufacture.

BRIEF DESCRIPTION OF THE DRAWINGS

FIG. 4 is a time line showing the sequencing of events described in FIG. 3; and

FIG. 5 is a diagram showing the serial bit coding of ASCII-code serial digital phrases "OK" and "GO" and how they can logically combine to form "GK".

DETAILED DESCRIPTION OF THE INVENTION

Figure 1:
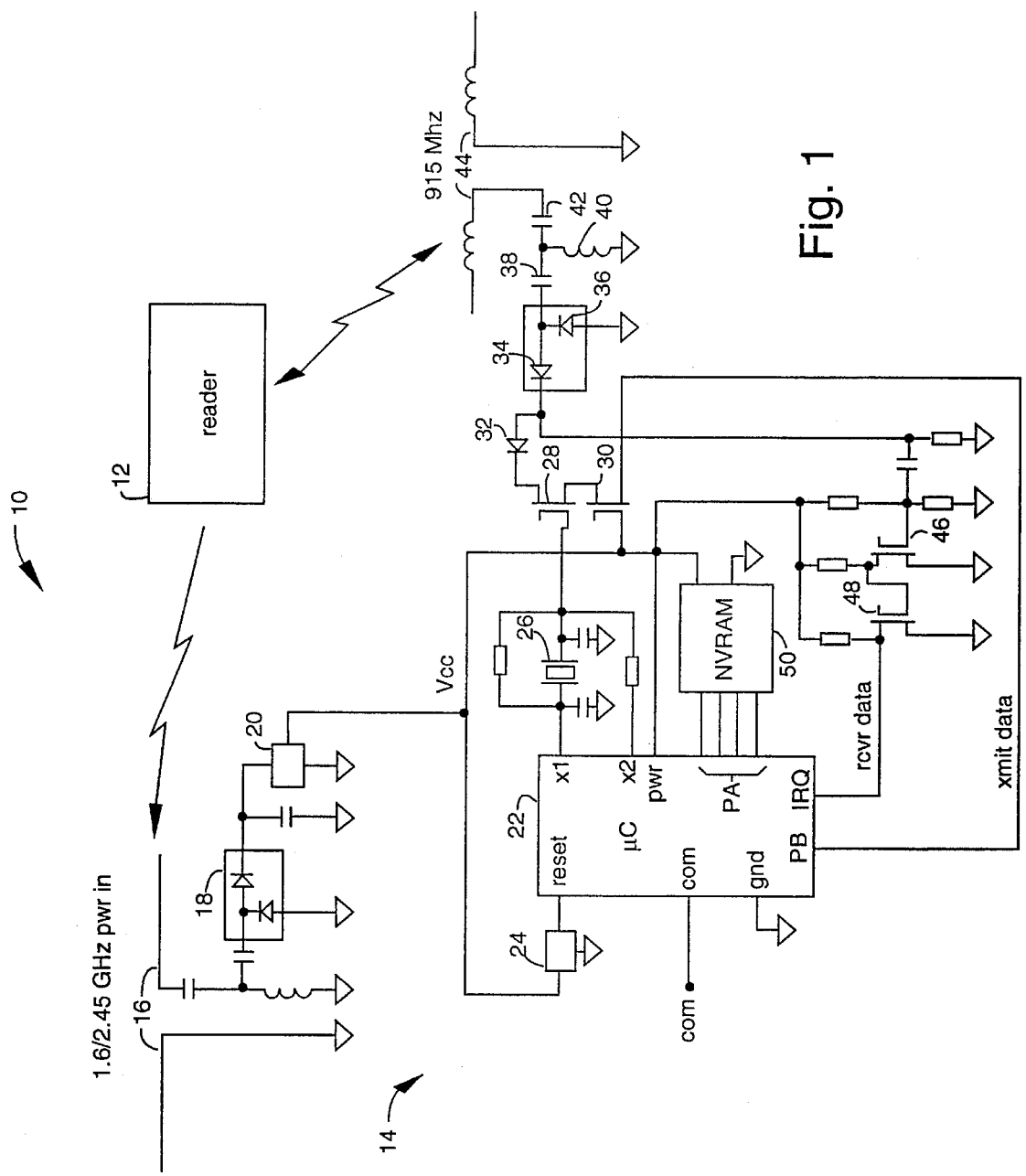
FIG. 1 is a block diagram of a tag-reading system embodiment of the present invention.

FIG. 1 illustrates a tag-reading system embodiment of the present invention, referred to herein by the general reference numeral 10. The system 10 comprises a reader 12 that emits a radio frequency burst, e.g., a continuous wave (CW) burst at 1.6 Ghz or 2.45 Ghz, depending on legal restrictions. A tag unit 14 receives the energy of the CW burst and uses it to generate direct current (DC) power for its digital circuitry. An antenna 16 is connected to a rectifier 18 that outputs a DC voltage proportional to the field strength of the DC burst. A voltage regulator 20 uses the DC voltage to produce a logic-compatible power supply (Vcc). A microcomputer 22 is held in a rest condition by a voltage detector 24 until the Vcc rises high enough to permit reliable operation of the microcomputer 22. A crystal 26, e.g., 1.0 MHz, provides a clock to operate the microcomputer 22 and a modulating tone for a pair of MOSFET transistors 28 and 30. A data port output line (PB) is connected to the MOSFET transistor 30 and causes it to switch on and off with digital data being generated by the microcomputer 22. When the MOSFET transistors 28 and 30 are turned on, a current flows through a set of steering diodes 32, 34, and 36 and the pulses excite a tuned circuit comprising a capacitor 38, an inductor 40, another capacitor 42 and a data antenna 44. For example, the tuned circuit operates at 915 MHz. The radio frequency signal output by the tag unit 14 is received by the reader, e.g., on a carrier frequency of 915 MHz 100% amplitude modulated by a one MHz tone. The antenna 44 can also receive radio transmissions from the reader 12. In this case, diodes 34 and 36 act as detectors and diode 32 as a blocking rectifier. The detected signal is connected through to an amplifier comprising a pair of MOSFET transistors 46 and 48. The amplified modulation, e.g., digital data, is connected to an input of the microcomputer 22. A non-volatile random access memory (NVRAM) provides data storage, e.g., for an assigned serial number. The microcomputer 22 may comprise a commercially-available CMOS-type, e.g., Motorola 68HC705J2. The NVRAM 50 may also comprise a commercially-available CMOS-type, e.g., National Semiconductor NM93C46AL.

In the applications contemplated by the present inventor, the recurring cost of manufacture of the tag unit 14 is critical. Ideally, the cost should not exceed one dollar. To that end, it would be advantageous to commit the implementation to a fully-custom CMOS chip. The elimination of the crystal 26 is especially important. Such crystals can cost three dollars alone. The system of FIG. 2 eliminates the crystal 26, but otherwise resembles tag unit 14 in FIG. 1.

Figure 2:
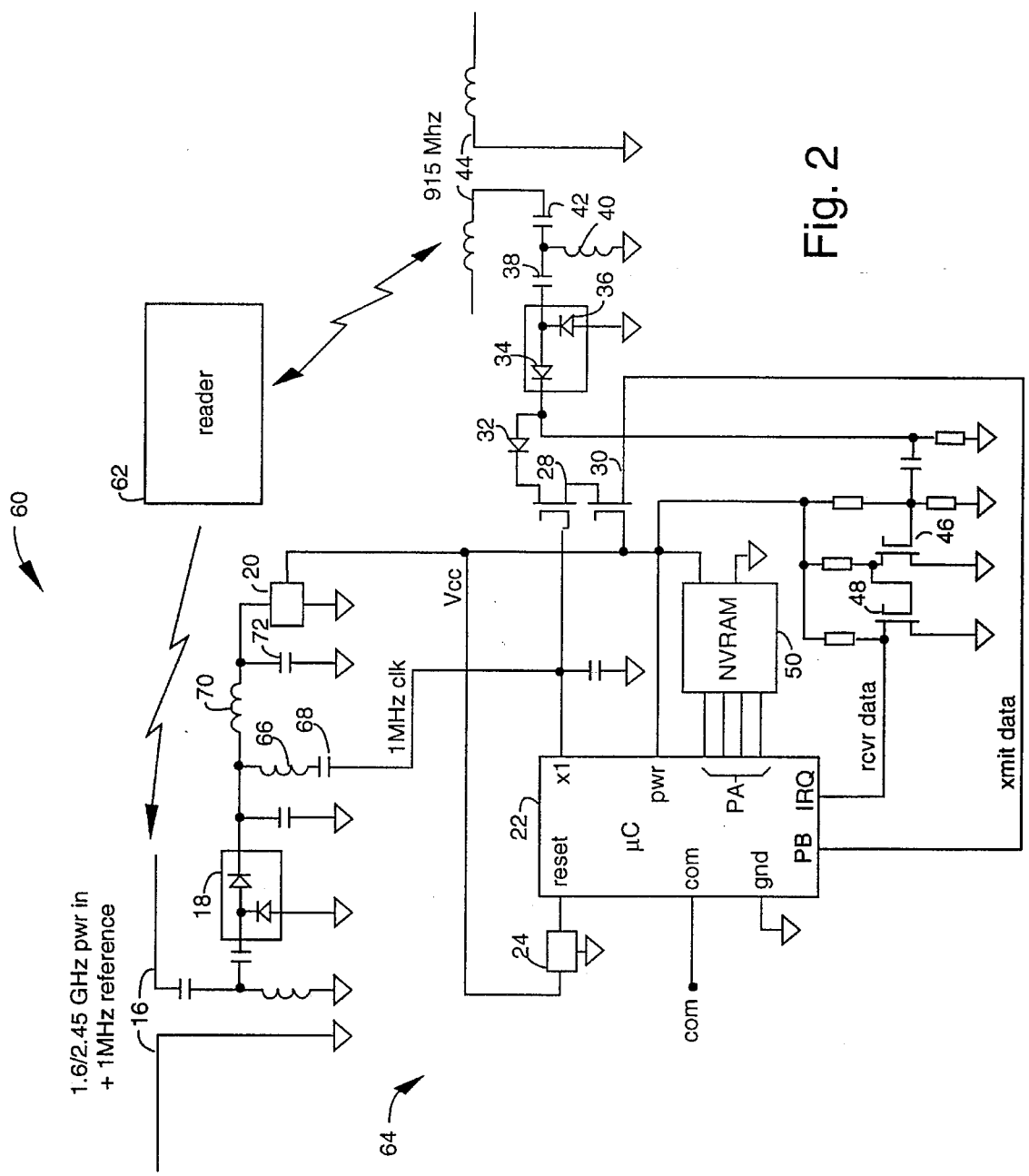
FIG. 2 is a block diagram of a second embodiment of the tag-reading system of FIG. 1.

In FIG. 2, a coded-radio-frequency identification system 60 is shown to comprise the same elements as the system 10, and so their element numbers are repeated. A reader 62 is similar to the reader 12 but further includes a one MHz tone modulated on its 1.6 Ghz RF output carrier. Such modulation is trivial to implement and conventional, therefore it is unnecessary to describe it further. A tag unit 64 is similar to the tag unit 14, but it eliminates the use of the crystal 26 needed in the tag unit 14. The detector 18 provides the one MHz AM tone to a series-resonant circuit comprising an inductor 66 and a capacitor 68. A low-pass filter comprising a choke 70 and a filter capacitor 72 removes the AM modulation and provides DC power to the voltage regulator 20. The one MHz tone is used directly to clock the microcomputer 22. All the tag units 64 in a particular area will be identically clocked, so the time slot reporting and character-report phasing will be very precise amongst the whole. The operation of the tag unit 64 is similar to the tag unit 14 in all other respects.

Figure 3:
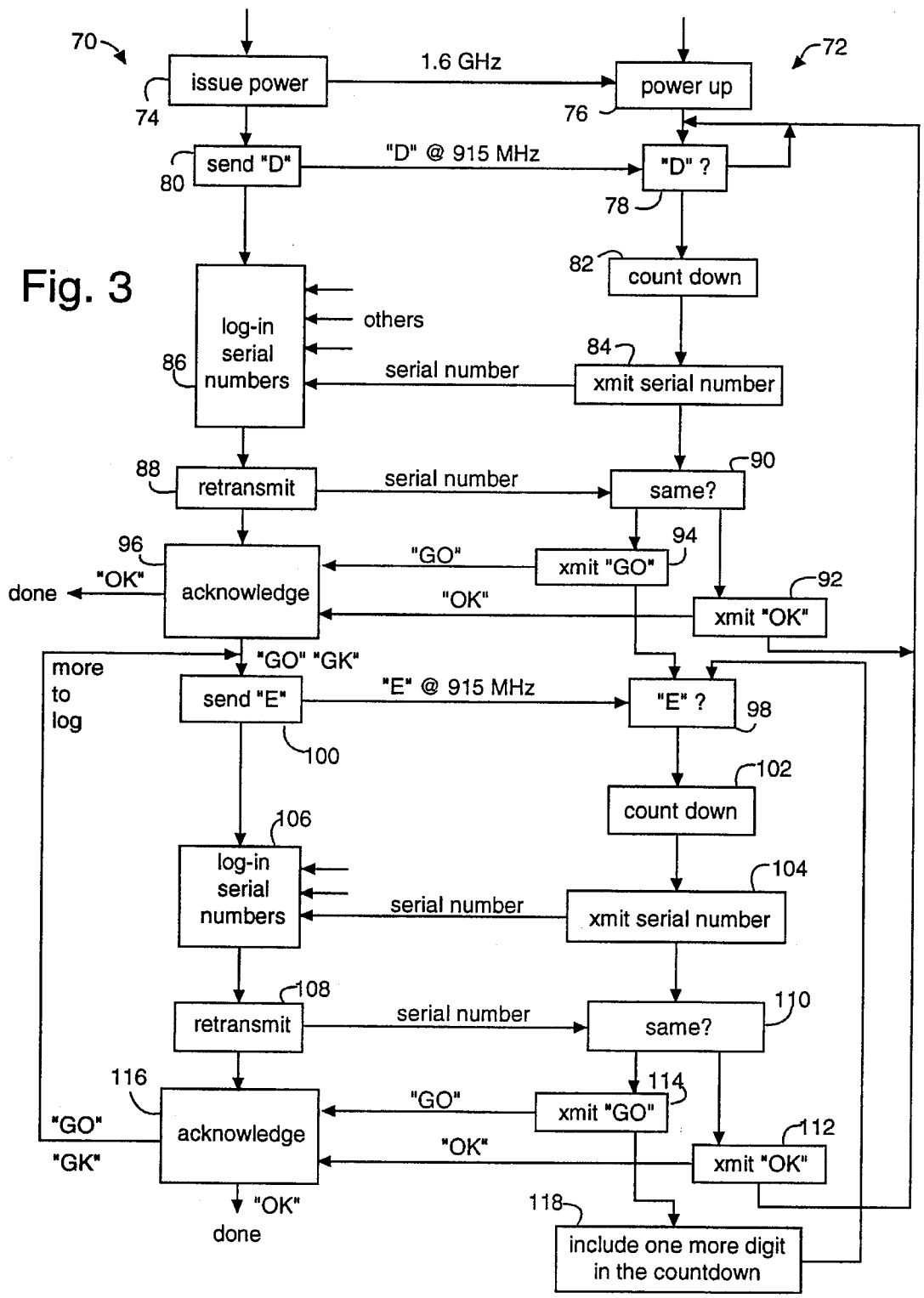
FIG. 3 is a flow chart of two cooperating processes for the tag-reading systems of FIGS. 1 and 2.

FIG. 3 represents a pair of processes 70 and 72 that cooperatively operate in the readers 12 and 62, and the tag units 14 and 64, respectively. A step 74 issues the 1.6 Ghz power illumination field from the readers. A step 76 receives the field and uses it to power up the tag units. A step 78 loops waiting to receive an ASCII-code serial digital character "D". A step 80 issues the ASCII-code serial digital character "D" to begin and synchronize a time period for the tag units nearby to report their serial numbers. A step 82 begins counting down a delay time from the receipt of the ASCII-code serial digital character "D" that is based on the value of the first digit of the serial number. In this way, as many as ten tag units with different first digits in their serial numbers can report in without colliding with the other reporting tag units. A step 84 transmits the serial number after the appropriate delay, e.g., using ASCII-code serial digital characters for numerals so that any part of the serial numbers cannot be confused with the letters "D" or "E". A step 86 logs in all the serial numbers that report in. If none report in after a reasonable time, the control can be returned back to the step 80. A step 88 retransmits the logged in serial numbers. A step 90 checks to see if its associated serial number was amongst those retransmitted. If so, the successful tag units are done and transmit an ASCII phrase "OK" in a step 92. Then control returns to the step 78 looking for an ASCII-code serial digital character "D". If the associated serial number was not received back, a step 94 transmits an ASCII phrase "GO" in the same time slot that "OK" is transmitted in step 92. A step 96 reads the response. If it reads "OK", then process 70 is finished. Only one tag unit was reporting in the area and it verified the serial number received. No response can be used to try again at step 74. A step 98 loops waiting to receive an ASCII-code serial digital character "E". If the response in step 96 was "GO" or appeared to be "GK", then a step 102 issues an ASCII-code serial digital character "E" to advance to the next level. The ASCII-code serial digital character "E" begins and synchronizes another time period for the tag units nearby to report their serial numbers. A step 102 begins counting down a delay time from the receipt of the ASCII-code serial digital character "E" that is based on the value of the first two digits of the serial number. In this way, as many as ten tag units, e.g., with different second digits and the same first digits in their serial numbers can report in without colliding with the other reporting tag units. A step 104 transmits the serial number after the appropriate delay. A step 106 logs in all the serial numbers that report in. If none report in after a reasonable time, the control can be returned back to the steps 80 or 100. A step 108 retransmits the logged in serial numbers. A step 110 checks to see if its associated serial number was amongst those retransmitted. If so, the successful tag units are done and transmit an ASCII phrase "OK" in a step 114. Then control returns to the step 78 looking for an ASCII-code serial digital character "D". If the associated serial number was not received back, a step 114 transmits an ASCII phrase "GO" in the same time slot that "OK" is transmitted in step 112. A step 116 reads the response. If it reads "OK", then process 70 is finished. If the serial number retransmitted in the step 108 was not the same, a step 118 includes one more digit in the count down used by the step 102 and returns control back to the step 98. In this way, serial numbers of any length can be accommodated, although a practical serial number length is four digits, e.g., "0000"–"9999", which provides for as much as 10,000 tags to be in the same responding area.

FIG. 4 represents an execution time plan for the processes 70 and 72. The first time period "power up" provides for steps 74 and 76. The second time period "D" provides for steps 78 and 80. The third time period "log-in serial numbers" provides for steps 82, 84 and 86. The fourth time period "retransmit serial numbers" provides for steps 88 and 90. The fifth time period "OK, GO, GK" provides for the steps 92, 94 and 96, and is detailed to the bit time level in FIG. 5. The sixth time period "E" provides for steps 98 and 100. The seventh time period "log-in serial numbers" provides for steps 102, 104 and 106. The eighth time period "retransmit serial numbers" provides for steps 108 and 110. The ninth time period "OK, GO, GK" provides for the steps 112, 114 and 116. The eleventh time period "E" represents a return by the step 118 to the step 98.

The processes 70 and 72 may be implemented as computer program software mounted on respective microcomputers, e.g., microcomputer 22 and readers 12 and 62.

FIG. 5 represents the modulated radio transmission of the acknowledgments "OK" and "GO" by the tag units 14 and 64. Zeroes are sent out as a CW carrier, and ones are sent as no carrier at all, e.g., mark and space. Thus a zero start bit begins with CW carrier on. Two stop bits are signaled by no carrier for two bit times. If the acknowledgments are singular, the reader 12 will receive one or the other. But if the acknowledgments collide, they will collide in character phase and will meld into "GK", the logical AND-combination of ASCII "O" and "G" (0100,1110 and 0100,0110) produces "G", and the logical AND-combination of ASCII "K" and "O" (0100,1010 and 0100,1110) produces "K". Thus any valid response comprises 0100,X110 followed by 0100,1Y10, where X=0 indicates some tag is present but the returned serial number was not correct, and Y=0 indicates the returned serial number matched by one of the tag units responding.

Although particular embodiments of the present invention have been described and illustrated, such is not intended to limit the invention. Modifications and changes will no doubt become apparent to those skilled in the art, and it is intended that the invention only be limited by the scope of the appended claims.

```
;Copyright © 1995 by the Regents of the University of California
;Concept and program code by Michael A. Doty
;The processor used is Mot 68HC705J2
;The code is writen for the "Amtex Project"
;It will allow a unlimited (5^27 if the correct sized serial is used in place
;of 32 bits used in this code) number of tags if powered up at the same time
;to be identified.  Identify serial numbers as well as read and write to the
;120 bytes is supported.  The tags communicate and are powered by RF.
.INCLUDE ref.inc
*
*          top of stack (64 Bytes $CO_$FF).
*
           .CODE
           EXTERNAL    wds,send_comm, get_comm,ee_write,send_7, ee_ewen, get_ee_byt
           org         $0F00
mor        db          %00000000
           org         $0Ff8h              ;timer vector
           fdb         start
           fdb         serial int          ;irq vector
           fdb         start               ;swi vector
           fdb         start               ;reset vector
           org         $0700
start      sei                             ;disable interrupts
           lda         #01h
           sta         sub_pointer         ;set up this guy
           bclr        d b,comport         ;for when it comes on
           LDA         #FFH
           sta         ddrb                ;all of port b a output
           bset        s d,comport         ;set high for rs232 tx should be
           bclr        sk,eeport           ;lower sk before ddra
           lda         #Efh                ;ALL BUT PA4
           sta         ddra                ;makes port bits 0,1,2,3,5,6,7 output
;read old serial number
           ldx         #serial number   ;save it in serial number how odd!
           lda         #04
           sta         R0
           lda         #01
           sta         R1
           jsr         get_ee_bytes
           ldx         #protect            ;load the write
           lda         #01h                ;protect byte into
           sta         R0                  ;ram var protect
           lda         #00h
           sta         R1
           jsr         get_ee_bytes
;Is the old serial number good?
           lda         #04
           sta         R7
           ldx         #serial_number      ;get the first char
rp         lda 0,x                         ;FFFF is not a good number incx
           cmp         #ffh
           bne         main
           dec         R7                  ;does it = ff (unprogramed)
           bne         rp
           imp         get_serial_#
;serial does not = ffffffff so its assumed good
main       lda         #44h                ;"D" to start
           sta         char
```

© 1995 University of California

Appendix I, page 1

```
                bclr        odd_even,flags      ;try
                clr         pointer             ;start with 0
                jsr         get_next_bit_4      ;looking for a char of some sorts
look            lda         #01                 ;this gets 1 char
                sta         R1
                ldx         #buffer
                bset        d_b,comport ;debug
                jsr         get_comm
back_look
                ldx         #buffer
                lda         0,x                 ;get the recived char
                cmp         char                ;"D" for dec
                bne         look
d_stuf
                brset       cer,flags,look
                dec         bit  4
                tst         bit 4
                bmi         coneinue
                bra         look
continue
                jsr         Trans Echo
                brclr       cer,f_fags,done
                jsr         get_next_bit_4
                lda         char
                inca
                sta         char
                bra         look
on return from this, if the okk flag is high then ident succesful
Trans_Echo
                jsr         send_s_#
                brclr       cer,flags,don       ;echo was    correct!
                bset        okk,flags           ;flag high   echo ok
                rts
don             bclr        okk,flags           ;flag low    bad echo
                rts
get_next_bit_4              get_next_2
                ldx         pointer
                lda         serial_number,x     ;have the right byte
                sta         bit_4                         ;bit_2
                brset       0,Sub pointer,zero
                brset       1,sub_pointer,one
                brset       2,sub_pointer,two
three           rora
                rora
                rora
                rora
                rora
                rora
                and         a,#03h
                sta         bit 4
                lda         #oiii
                sta         sub_pointer
                inc         pointer
                rts
two             rora
                rora
                rora
                rora
```

© 1995 University
of California

Appendix I, page 2

```
              and       a,#03h
              sta       bit 4
              lda       # 08fi
              sta       sub_pointer
              rts
one           rora
              rora
              and       a,#03h
              sta       bit 4
              lda       #04fi
              sta       sub_pointer
              rts
zero          and       a,#03h
              sta       bit 4
              lda       #02fi
              sta       sub_pointer
              rts
done          lda       #01
              sta       R1
              ldx       #buffer
              jsr       get_comm          ;looking for command
              ldx       #buffer
              lda       0,x
              cmp       #57h              ;W
              beq       write data
              cmp       #52h              ;R
              beq       read_data
;Looking for my serial number
a_loop        bclr      cer,flags         ;clear flag
              jsr       look 4 s#         ;look for s#
              brset     cer,fl_ags,a_loop ;found if flag clear
look_4_c
              lda       #01
              sta       R1
              ldx       #buffer
              jsr       get_comm          ;looking for command
              ldx       #buffer
              lda       0,x
              cmp       #57h              ;W
              beq       write data
              cmp       #52h              ;R
              beq       read data
              bra       a_loop
write_data
              lda       #02h
              sta       R1
              ldx       #buffer
              jsr       get_comm
;write protect code
              lda       #00
              sta       R0
              ldx       #buffer
              lda       0,x
              sub       R0
              beq       protect byte
              cmp       protect           ;no write over serial
              bls       no write          number
gowit         jsr       ee_ewen
```

© 1995 University of California

Appendix I, page 3

```
            ldx         #buffer
            lda         0,x
            sta         R1              ;address to write to
            lda         #01h
            sta         R0              ;number of succesive bytes
            ldx         #buffer+1
            jsr         ee_write        ;write to ee prom
            jsr         wds             ;disable writing
            bra         a_loop
no_write
            clrx
            lda         #4eh            ;"N"
            sta         buffer,x
            lda         #4fh            ;"O"
            incx
            sta         buffer,x
            ldx         #buffer
            lda         #02
            sta         R1
            jsr         send comm
            jmp         a_loop
protect_byte
            incx
            lda         0,x             ;get knew protect max
            cmp         protect
            bls         no_write
            sta         protect
            bra         gowit
read_data
            lda         #01h
            sta         R1
            ldx         #buffer
            jsr         get_comm
            ldx         #buffer
            lda         0,x
            sta         R1
            lda         #01
            sta         R0
            ldx         #buffer
            jsr         get_ee_bytes
            ldx         #buffer
            lda         #01
            sta         R1
            jsr         send comm
            jmp         a_loop ;the least sig 4 bits of a are dec on "D" until neg
send_s_#
            bclr        cer,flags       ;clear error flag
            ldx         #serial_number
            lda         #04
            sta         R1
            jsr         send comm
            bset        I,flags         ;turn ident echo error on
look_4_s#
            ldx         #buffer         ;get 4 bytes that could
            lda         #04             ;be this serial
            sta         R1
```

© 1995 University of California

Appendix I, page 4

```
                jsr     get_comm                ;have maby s# in buffer
                brset   cer,flags,BZ            ;in case more then 4 chars
                lda     R2                      ;if not all chars were rx ed
                cmp     R1                      ;without spaces then bad
                bne     BB                      ;returned early? bad bytes
;must see if 4 bytes in buffer                  4 bytes of serial_number
                bclr    m k,flags
                lda     #04
                sta     R5
                ldx     #buffer
                stx     R6
                ldx     #serial_number
                stx     R7
xxx             ldx     R7
                lda     0,x                     ;first byte
                sta     R1
                ldx     R6
                lda     0,x
                cmp     R1
                bne     SF                      ;not the same
                nop     ;used to balance time
                nop
                nop
                nop
aro             inc     R7
                inc     R6
                dec     R5
                lda     R5
                beq     choice
                bra     xxx
SF              bset    m k,flags               ;not the serial
                jmp     aro
BB              bset    cer,flags               ;not the same number!
BZ              rts
choice          brclr   I,flags,BqB             ;5 cyc      ;do not mess up others
                brset   m_k,flags,send_fo ;5 cyc
                jmp     send ok                 ;3 cyc
BqB             brset   m_k,flags,BB            ;5 cyc      ;bad no reply
                ;else   send ok
send_ok
                bclr    I,flags                 ;5 cyc      ;turn off it
;               bclr    I,flags                 ;5 cyc      ;turn off it
;               bclr    I,flags                 ;5 cyc      ;turn off it
                ldx     #02h                    ;2 cyc      ;"GOOK" in mem
                jmp     pmt                     ;3 cyc
send_fo
                bclr    m k,flags               ;5 cyc
                bset    cer,flags               ;5    cyc not the same number!
                clrx    ;3                      cyc
pmt             lda     fo,x                    ;5      cyc
                sta     buffer                  ;4      cyc
                incx    ;3                      cyc
                lda     fo,x                    ;5      cyc
                sta     buffer+1                ;4      cyc
*dd             ldx     #buffer                 ;2      cyc
                lda     #02                     ;2      cyc
                sta     R1                      ;4      cyc
                jsr     send_comm               ;6      cyc
```

© 1995 University of California

Appendix I, page 5

```
              rts
*
*        get a new serial number.
*
get_serial_#
         clrx
tmp      lda       message,x        ;move the load message to the buffer.
         sta       buffer,x
         incx
         cpx       #15
         bne       tmp
         ldx       #buffer
         lda       #15
         sta       R1
         jsr       send_comm        ;send the load message.
         ldx       #buffer          ;buffer
         lda       #04              ;4 byte serial number
         sta       R1
         jsr       get_comm         ;get the serial number into buffer.
         ldx       #bu_ffer
         lda       #04
         sta       R1
         jsr       send_comm        ;echo the serial number from memory
         jsr       ee_ewen          ;enables eraseing and writing
         lda       #04
         sta       R0               ;4 char to send
         ldx       #buffer          ;x= source of data to write
         lda       #01              ;r1 is address in ee prom 01_04=s#
         sta       R1               ;8 bits of address in eeprom
         jsr       ee_write         ;write s# to ee prom
         ldx       #buffer
         lda       #04
         sta       R0
         lda       #01              ;ee address of serial
         sta       R1
         jsr       get_ee_bytes     ;get back from ee prom
         ldx       #buffer
         lda       #04
         sta       R1
         jsr       send_comm        ;send it out serial port
         lda       #04h             ;protect byte count
         sta       R2
         lda       #01h
         sta       R0               ;R0 is number of bytes to write
         lda       #00h
         sta       R1               _R1 is ee prom strating address
         ldx       #R2              ;x is the source byte/s address
         jsr       ee_write
         jsr       wds              ;remove write enable
         imp       start            ;go back
*
* delay 34us (one bit time);
*
GLOBAL delay_1_bit
delay_1_bit:
;bsr is 12us
rts            ;+6us       24us
serial_int: rti
```

© 1995 University of California

Appendix I, page 6

```
fo          byte        'GO'
ok          byte        'OKI
message     BYTE        I Enter the # ',OdH
            .BYTE       OaH
end
            .LINKLIST
.GLOBAL eeport,ddra,cs,d i,d o
            eeport      equ         $00     ;eeprom is on port la' bits 4_7.
            ddra        equ         $04     ;data dir reg
            ddrb        equ         $05     ;ddrb reg location
            portb       equ         $01     ;port b
            ram         equ         $90     ;start of ram
            cs          equ         $07     ;eeprom chip select.
            sk          equ         $06     ;eeprom serial clock.
            d_i         equ         $05     ;eeprom data in (to eeprom).
            d_o         equ         $04     ;eeprom data out (from eeprom).
            eepdr       equ         $E8     ;load to ddrb for ee receive.
            comport     equ         portb   ;communications is through port b bit 0
            s           d           equ     $00     ;communications serial data.
            d           b           equ     $01     ;debug bit
            m           k           equ     $02     ;transimit control bit
            I                       equ     $03     ;a control bit
            tscr        equ         $08     ;timer status and control register
            rt0         equ         $00     ;real_time interrupt select 0
            rt1         equ         $01     ;real_time interrupt select 1
            rtifr       equ         $02     ;real_time interrupt flag reset
            tofr        equ         $03     ;timer overflow flag reset
            rtie        equ         $04     ;real_time interrupt enable
            toie        equ         $05     ;timer overflow interrupt enable
            rtif        equ         $06     ;real_time interrupt flag
            tof         equ         $07     ;timer overflow flag
            br          equ         $07     ;byte ready flag.
            cer         equ         $06     ;comm error flag.
            okk         equ         $00     ;use in ident
            odd_even    equ         $01     ;ues in ident
            .PAGE0
            org         ram
.protect    rmb         1                   ;protect pointer address 0
*           tag serial number (4 bytes, 32 bits).
* this area is       loaded from eeprom at program startup and cannot be shared!
serial_number       rmb 4           ;address 1,2,3,4
* communications    buffer (13 bytes).
* data in this buffer is sent and received byte 0 first.
buffer      RMB         15                  ;address 5_20
GLOBAL      comport,eeport,ddra
            GLOBALS ON
R0          rmb         1                   ;general use registers
R1          rmb         1
R2          rmb         1
R3          rmb         1
R4          rmb         1
R5          rmb         1
R6          rmb         1
R7          rmb         1
R8          rmb         1
bit 4       RMB         1                   ;this is dec to neg
flags       rmb         1                   ;flags reg
pointer     rmb         1                   ;to serial # bytes
```

© 1995 University of California

Appendix I, page 7

```
d counter     rmb      1                   ;number of Id's counted
char          rmb      1                   ;rx char var
sub_pointer   rmb      1                   ;sub pointer used in ident bit pairs
GLOBALS OFF
*
* top of stack (64 Bytes $C0_$FF).

L I p P_4y
.LINKLIST
.SYMBOLS
*
*           enter with x reg= address of source
*           Ro holds the number of succesive bytes
*           that will be written to eeprom at
*           the starting address of R1
            .GLOBAL   wds,ee_write,ee_ewen,get_ee_bytes,sub_O,sub_1
Cs          equ       07
d_b         equ       01
d_o         equ       04
d_i         equ       05
sk          equ       06
shit        equ       6
.PAGE0
.EXTERNAL   RO,R1,R2,R3,R4,comport,eeport,ddra
            .DATA
            .CODE
ee_write
            bclr      cs,eeport           ;de_select chip
            bset      cseeport            ;chip selcet
bth
            jsr       sub 1               ;start bit
            jsr       sub 0               ;op code
            jsr       sub_1               ;op code
address on eeprom next ***
            stx       R4                  ;save buffer add
            lda       R1                  ;R1 has eeprom address
            inc       R1                  ;for next time
            CLC
            jsr       send          7     ;send address
            ldx       R4                  ;gets buffer address
            inc       R4
            lda       O,x                 ;first buffer location
            jsr       send_8              ;send first byte to eeprom
            bclr      cs,eeport
            bset      cs,eeport           ;chip selcet
            ldx       R4
            jsr       ten ms              ;wait 10 MS
            dec       RO
            lda       RO                  ;number of bytes to write
            bne       bth
            bclr      cs,eeport           ;power down
            rts
ten_ms
brclr   d_o,eeport,ten_ms
rts
sends the 8 bits in a to the eeprom send_8      ldx       #08h
```

© 1995 University of California

Appendix I, page 8

```
end_8       rola            ;rotate the byte msb into the carry flag.
            bcc     eel1            ;test the bit.
            bset    d_i,eeport      ;1
            bra     eel2
eel1        bclr    d_i,eeport      ;0
            bra     eel2            ;balance the time for bra eel2 above.
eel2        bset    sk,eeport       ;clock the bit into the eeprom.
            bclr    sk,eeport
            decx                    ;decrement the bit counter.
            bne     end_8           ;last bit?
            bclr    cs,eeport       ;cycle chip select
            bset    cs,eeport
            rts

* sends the 7 bits in a to the eeprom
*
send_7
            rola                    ;8 bit word comes in
            ldx     #07h
end_7       rola                    ;rotate the byte msb into the carry flag.
            bcc     eeel1           ;test the bit.
            bset    d_i,eeport      ;1
            bra     eeel2
eeel1       bclr    d_i,eeport      ;0
            bra     eeel2           ;balance the time for eel2 above.
eeel2       bset    sk,eeport       ;clock the bit into the eeprom.
            bclr    sk,eeport
            decx                    ;decrement the bit counter.
            bne     end_7           ;last bit?
            rts

*           enter ee write with x reg= address of source
*           R0 holds the number of succesive bytes
*           that will be written to eeprom at
*           the starting address of R1
*           gets the 8 bits in a from the eeprom
get_8       ldx     #08h
sget_8      bset    sk,eeport       ;data active here
            bclr    sk,eeport
            brset   d_o,eeport,itsi ;test the bit.
itso        lda     R3              get byte
            clc
            rola
            sta     R3
            bra     see if done
itsi        lda     R3
            sec
            rola
            sta     R3
see_if_done decx
            bne     sget_8          ;last bit?
            lda     R3
            bclr    cs,eeport       ;cycle
            bset    cs,eeport       ;chip selcet
            rts
```

© 1995 University of California

Appendix I, page 9

```
*
*       ee_wt_ack signals to the eeprom that the operation is complete
*       then waits for the eeprom to signal success by raising the d_o
line.
*
ee_wt_ack:
          bclr      cs,eeport         ;signal end of write operation.
          bset      cs,eeport
wal       brclr     d_o,eeport,wal    ;wait for ready flag.
          bclr      cs,eeport
          rts
;erase\write enable ee_ewen
          bset      cs,eeport         ;chip selcet
          jsr       sub 1             ;start bit and
          jsr       sub 0             ;op code
          jsr       sub 0             ;its 100110000
          jsr       sub 1
          jsr       sub 1
          ldx       #05               ;need 5 zeros
zeros     jsr       sub_0
          decx
          cpx       #00h
          bne       zeros
          bclr      cs,eeport
          bset      cs,eeport
          bclr      cs,eeport         ;power down
          rts
*         erase\write dis_enable
*
wds
          bset      cs,eeport         ;chip selcet
          jsr       sub 1             ;start bit and
          jsr       sub 0             ;op code
          jsr       sub 0             ;its 100000000
          jsr       sub 0
          jsr       sub 0
          ldx       #05               ;need 5 zeros
zzeros    jsr       sub_0
          decx
          cpx       #00h
          bne       zzeros
          bclr      cs,eeport
          bset      cs,eeport
          bclr      cs,eeport         ;power down
          rts sub_0
          bclr      d_i,eeport
          bset      sk,eeport
          bclr      sk,eeport
          rts
sub_1     bset      d_i,eeport
          bset      sk,eeport
          bclr      sk,eeport
          rts
```

© 1995 University of California          Appendix I, page 10

```
;get R0 number of 8 bit bytes to read from eeprom starting at address R1 and
;place them in memory starting at ram address pointed to by ix. uses R0, R1
;R2, R3, & R4.
get_ee_bytes:
          bclr      skleeport         ;make sure the sk line is low.
          stx       R4                ;save the ram address.
a_ra      bset      cs,eeport         ;chip selcet
          jsr       sub 1             ;start bit and
          jsr       sub 1             ;op code for read
          jsr       sub 0             ;its 110 + 7 BIT ADDRESS
          lda       R1                ;R1 has address
          jsr       send 7            ;send address 7 bits
          jsr       get 8
          ldx       R4
          sta       0,x
          inc       R4                ;step ix by one
          inc       R1                ;step add to get data from
          dec       R0
          bne       a_ra
          bclr      cs,eeport         ;power down
          rts LINKLIST
          .SYMBOLS
comport   equ       #01
cer       equ       $06
;flags    equ       $0E
d_b       equ       $01
s_d       equ       $00
.PAGE0
.EXTERNAL R0,R1,R2,R3,R4,R5,R6,R7,flags .CODE
.EXTERNAL delay_1_bit ;read (R1) bytes from the serial port to ix. load R1 with number to get
before ;calling. uses R1, R2, R3, R4, R7, flags bit 6
          GLOBAL    get_comm
get_comm:
          stx       R3
          clr       R2                ;10us zero the buffer index.
          bclr      cer,flags         ;clear the comm errorn flag.
          jsr       dead time         ;one byte time high!
gc0       BIH       gc0               ;6us cycle wait for the start.
* untill this line goes low theres no incoming signal
gc1       bclr      d b,comport       ;10us start of the start bit
          bih       bad bit           ;6us bad start bit (test for low)
          bclr      d_b,comport       ;debug half way though the start bit
          bra       gc2               ;6us good start bit
          bad start bit
bad_bit   bset      cer,flags         ;return with the comm error flag set.
          rts
this sub waits for .85 ms continuous high befor returning
dead_time
          lda       #35               ;35 X (14 x 2us)   .85 ms
          sta       R7
dead_times
          bih       count             ;3
```

© 1995 University of California

Appendix I, page 11

```
            bra       dead time
count       dec       R7                  ;5 cycles
            beq       bback               ;3
            bra       dead_times          ;3
bback       rts
end_time
            lda       #40                 ;one bit time?
arh         bil       bad_bit             ;3
            deca                          ;3
            bne       arh                 ;3
            bclr      cer,flags           ;reset error flag
            rts

* start bit is good, get the other eight bits
*
gc2         jsr       delay_1_bit         ;19us wait til the middle of this bit.
            clra      6us
            clrx      6us clear the bit counter.
gc3         jsr       delay 1 bit         ;19us wait til the middle of this bit.
booboo      bclr      d_b,comport         ;10usdebug
            bclr      d_b,comport         ;10usdebug
            bih       one                 ;set the carry according to int pin state
zero        clc                           ;clear the carry bit
            bra       shifty
one         sec
            bra       shifty
shifty      lda       R7
            rora                          ;move carry bit into a
            sta       R7                  ;store it back
            incx
            cpx       #$08                ;last bit?
            beq       stor
            bra       booboo              ;another bit
stor
            lda       R3                  ;r7 is the 8 bits we want to save
            add       R2                  ;r2 holds 0,1,2,3 index
            sta       R4                  ;r4 just away to transfer a to x
            ldx       R4                  ;x has address
            lda       R7                  R7 is data to stor in R3's area
            sta       x                   doit
            inc       R2                  for next time
            ldx       R2                  ;put index byte in x
            cpx       R1                  f,R1 = 04
            blo       inbe                ;another byte
            bra       end_time            ;back porch
inbe
            lda       #07                 ;about 126 us long was 40 dec cycles
inbei       bil       gc1                 ;which is about 3 bit times
            deca                          ;which is to long for consucutive
            bne       inbei               bytes
            rts

.LIST OFF

.LINKLIST
.SYMBOLS
*       uses port b pin 0 for comm out
```

© 1995 University of California

Appendix I, page 12

```
* send (R1) bytes from ram indexed by ix to serial port.
* also uses R2, & R3. with 1 mhz xtal cycle    2us
* comport     equ         #01
s_d         equ         $00
d_b         equ         $01
cer         equ         $06
            .PAGE0
            .EXTERNAL   R1
            .EXTERNAL   R2
            .EXTERNAL   R3
            .CODE
            .EXTERNAL   delay_1_bit
*
* delay   34us (one bit time);
*
GLOBAL send_comm send_comm:
            stx         R2              ;buffer address.
            lda         R1              ;calculate the end address by adding
            add         R2              ;the start length to the start address
            sta         R1              ;save back in R1.
strt        jsr         delay_1_bit     ;time between bytes +24us
            bclr        s_d,comport     ;send start bit.
            jsr         delay_1_bit     ;start bit lasts 70us.
            nop                         ;to add 4 us =12195 baud
            ldx         R2              ;recover buffer index.
            lda         0,x             ;get next byte to transfer.
            inc         R2              ;get ready to get the next byte.
            clr         R3              ;clear the bit shift counter.
            ss1         lsra            ;move lsb of byte to carry flag.
            bcc         ss2             ;set or clear tx bit according to carry
            bset        s_d,comport     ;1
            bra         ss3
ss2         bclr        s_d,comport     ;0
            bra         ss3             ;need for timing
ss3         jsr         delay_1_bit     ;bit lasts 70us.
            ldx         R3              ;recover the bit shift counter.
            incx                        ;increment bit shift counter.
            stx         R3              ;save the bit shift counter.
            cpx         #8              ;eight bits.
            blo         ss1             ;if not last bit do another.
            bset        s_d,comport     ;send stop bit.
            jsr         delay_1_bit     ;stop bit lasts 96us.
            jsr         delay_1_bit     ;24us for resync
            jsr         delay_1_bit     ;24us
            jsr         delay_1_bit     ;24us
            ldx         R2              ;recover the buffer pointer.
            cpx         R1              ;last byte to send?
            blo         strt            ;if not get the next.
            rts
```

© 1995 University of California

Appendix I, page 13

The invention claimed is:

1. A coded-radio-frequency identification system (10, 60), comprising:

a reader (12, 62, 70) with a first radio frequency (RF) transmitter that provides for the transmission of a first start character and a log of received serial numbers and a first RF receiver that provides for the reception of a plurality of tag unit serial numbers;

a tag unit (14, 64, 72) with a second RF receiver (34, 36, 38, 40, 42, 44, 46, 48) that provides for the reception of said first start character and a second RF transmitter (28, 30, 32, 34, 36, 38, 40, 42, 44) that provides for the transmission of a unique serial number and an acknowledge character and a not-acknowledge character;

timing means (22, 82, 102) connected to said second RF receiver and to a memory (50) for storing said unique serial number and providing for a time delay proportional to a first part of said unique serial number and connected to the second RF transmitter to send said unique serial number after said time delay;

retransmission means (12, 62, 88, 108) for repeating said serial numbers received by said first RF receiver with said first RF transmitter;

matching means (22, 90, 110) connected to said second RF receiver to compare said repeated serial numbers with said unique serial number in said memory and connected to transmit with said second RF transmitter said acknowledge character if a match occurred and said not-acknowledge character if a match did not occur;

acknowledgment means (12, 62, 96, 116) connected to said first RF receiver to receive said acknowledge characters and said not-acknowledge characters from a plurality of tag units, wherein a simultaneous occurrence of both said acknowledge characters and said not-acknowledge characters combines to form a legitimate composite character;

log-in means (12, 62, 86, 106) for storing said repeated serial numbers when said acknowledge character is received; and collision occurrence means (12, 22, 62, 98–118) for using a second portion of said unique serial number to control the timing means.

2. The system of claim 1, further providing:

a third RF transmitter in the reader (62) and a third RF receiver (16, 18) in the tag unit (64) which communicate a power illumination field having a carrier frequency of about 1.6 Ghz modulated by a clocking reference tone signal that provides operating power to the tag unit (64), and wherein said clocking reference tone signal is connected to provide (66, 68) a timing reference for the timing means (22, 82, 102).

3. The system of claim 2, wherein:

the tag unit (64) comprises a microcomputer (22) powered by a regulated power supply (20, 70, 72) connected to said third RF receiver (16, 18).

4. The system of claim 1, wherein:

the acknowledgment means (12, 62, 96, 116) further comprises verification means (92, 94, 112, 114) and are such that said acknowledge characters comprise an ASCII-code serial digital phrase "OK" and said not-acknowledge characters comprise an ASCII-code serial digital phrase "GO", wherein a simultaneous occurrence of both said acknowledge characters and said not-acknowledge characters combines to form a legitimate composite ASCII-code serial digital phrase "GK".

5. The system of claim 1, wherein:

the second RF transmitter (28, 30, 32, 34, 36, 38, 40, 42, 44) comprises a first transistor (30) connected to be switched by a data output port (PB) of a microcomputer (22), a second transistor (28) connected in series with said first transistor (30) and having an input connected to a clock input (X1) of said microcomputer (22), a set of steering diodes (32, 34, 36) connected in series with the first and second transistors (30, 28), a T-resonant circuit (38, 40, 42) connected to said set of steering diodes (32, 34, 36), and an antenna (44) connected to radiate energy from said T-resonant circuit (38, 40, 42) injected by said microcomputer (22) and said first and second transistors (30, 28).

6. The system of claim 1, wherein:

the second RF receiver (34, 36, 38, 40, 42, 44, 46, 48) comprises a first transistor (48) connected to a data input port (IRQ) of a microcomputer (22), a second transistor (46) connected ahead in cascade with said first transistor (48) and having an input connected to a set of detector diodes (34, 36), a T-resonant circuit (38, 40, 42) connected to said set of detector diodes (34, 36), and an antenna (44) connected to said T-resonant circuit (38, 40, 42).

7. A method (70) for collecting data from a large number of reporting units (14, 64) in a localized area that all attempt to report simultaneously, the method comprising the steps of:

sending (80) a first interrogation signal ("D");

receiving (86) a plurality of data signals;

retransmitting (88) at least a portion of said data signals;

receiving (96) at least one of two types of verification signals ("OK", "GO") that appear to be a third type of verification signal ("GK") when said first two types of verification signals ("OK", "GO") are simultaneously received from at least two different sources;

quitting ("done") if said verification signal was a first of said first two types ("OK"); and repeating the steps of sending (100), receiving data (106), retransmitting (108) and receiving verification (116) with a second interrogation signal ("E") if said verification signal received was a second of said first two types ("GO") or was said third type ("GK").

8. A method (72) for sending data from each of a large number of reporting units (14, 64) in a localized area that all attempt to report simultaneously, the method comprising the steps of:

receiving (78) a first interrogation signal ("D");

transmitting (82, 84) an identification signal after a delay time dependent on a value represented by said identification signal;

receiving back (90) a repeated identification signal;

sending (92, 94) one of two types of verification signals ("OK", "GO") according to whether said repeated identification signal included said transmitted identification signal;

quitting (92 to 78) if said verification signal sent was a first of said first two types ("OK"); and repeating the steps of receiving (98), transmitting (102, 104) an identification signal, receiving back (110) and sending verification (112, 114) if said verification signal sent was a second of said first two types ("GO") and a second interrogation signal ("E") is received.

9. A pair of cooperative processes (70, 72) for a coded-radio-frequency identification system (10, 60), the pair comprising the steps of:

issuing (74) a power illumination field from a reader (12, 62);

receiving (76) said power illumination field to power up a tag unit (14, 64);

waiting (78) to receive an ASCII-code serial digital character "D";

transmitting (80) said ASCII-code serial digital character "D" to begin and synchronize a time period for said tag units nearby to each report a unique serial number;

counting down a delay time (82) from said receipt of said ASCII-code serial digital character "D" based on a value represented by a first digit of said serial number, wherein as many as ten tag units with different first digits in their respective unique serial numbers can report in without colliding with said other reporting tag units;

transmitting (84) said unique serial number after said appropriate delay;

logging-in (86) all said unique serial numbers that report in;

retransmitting (88) said logged in serial numbers;

checking (90) by each tag unit (14, 64) to see if its associated serial number was amongst those retransmitted, if so, said successful tag units are done and transmit (92) an ASCII phrase "OK", and if said associated serial number was not received back, transmitting (94) an ASCII phrase "GO" in said same time slot that "OK" would otherwise be transmitted;

reading (96) said responses of "OK" and "GO", if "OK", then said process (70) is finished because only one tag unit was reporting in said area and it verified said serial number received, but if said response was "GO" or appeared to be a "GK", then continuing by issuing (100) an ASCII-code serial digital character "E";

waiting (98) to receive said ASCII-code serial digital character "E" at said tag units (14, 64);

counting down a delay time (102) from said receipt of said ASCII-code serial digital character "E" based on a value in said first two digits of said serial number;

transmitting (104) said serial number after said delay time;

logging-in (106) all said serial numbers that report in;

retransmitting (108) said logged-in serial numbers; and checking (110) to see if said logged-in serial number included said unique serial number of a particular tag unit (14, 64), if so, such corresponding tag units are done and transmit (112) an ASCII phrase "OK", but if said associated serial number was not received back, such tag units transmit (114) an ASCII phrase "GO" in said same time slot that "OK" is otherwise transmitted;

reading (116) said response, if it "OK", then the process (70) is finished, otherwise if said serial number retransmitted was not the same, including (118) one more digit in the step of counting down (102) and returning back to the step of waiting (98) to receive said ASCII-code serial digital character "E" at said tag units (14, 64).

* * * * *